United States Patent
Tsirkin et al.

(10) Patent No.: US 10,365,937 B2
(45) Date of Patent: Jul. 30, 2019

(54) ENTROPY INCREASE BY EXECUTABLE LOADER

(71) Applicant: Red Hat Israel, Ltd., Raanana (IL)

(72) Inventors: Michael Tsirkin, Raanana (IL); Petr Matousek, Raanana (IL)

(73) Assignee: RED HAT ISRAEL, LTD., Raanana (IL)

( * ) Notice: Subject to any disclaimer, the term of this patent is extended or adjusted under 35 U.S.C. 154(b) by 498 days.

(21) Appl. No.: 14/808,185

(22) Filed: Jul. 24, 2015

(65) Prior Publication Data

US 2017/0024313 A1    Jan. 26, 2017

(51) Int. Cl.
| | |
|---|---|
| *G06F 9/455* | (2018.01) |
| *G06F 21/52* | (2013.01) |
| *G06F 21/51* | (2013.01) |
| *G06F 21/57* | (2013.01) |
| *G06F 9/445* | (2018.01) |

(52) U.S. Cl.
CPC .......... *G06F 9/45558* (2013.01); *G06F 21/51* (2013.01); *G06F 21/52* (2013.01); *G06F 21/577* (2013.01); *G06F 9/44521* (2013.01); *G06F 2009/45583* (2013.01); *G06F 2009/45587* (2013.01); *G06F 2212/1044* (2013.01)

(58) Field of Classification Search
CPC ..... G06F 8/30; G06F 8/54; G06F 8/71; G06F 8/423; G06F 8/427; G06F 9/445; G06F 9/4452
See application file for complete search history.

(56) References Cited

U.S. PATENT DOCUMENTS

| | | | |
|---|---|---|---|
| 8,321,850 B2 | 11/2012 | Bruening et al. | |
| 8,892,809 B2* | 11/2014 | Yang | G06F 12/023 709/247 |
| 9,063,899 B2 | 6/2015 | Epstein | |
| 9,147,070 B2* | 9/2015 | Panchenko | G06F 21/54 |
| 2010/0030998 A1 | 2/2010 | Kiriansky | |
| 2012/0017028 A1* | 1/2012 | Tsirkin | G06F 12/08 711/6 |
| 2012/0102295 A1* | 4/2012 | Yang | G06F 12/023 711/206 |
| 2012/0144480 A1* | 6/2012 | Miller | G06F 21/6218 726/22 |
| 2013/0086299 A1* | 4/2013 | Epstein | G06F 12/1475 711/6 |
| 2013/0132690 A1* | 5/2013 | Epstein | G06F 12/1416 711/159 |
| 2013/0227680 A1* | 8/2013 | Pavlyushchik | G06F 21/00 726/21 |

(Continued)

OTHER PUBLICATIONS

Gorka Irazoqui Apecechea et al. "Fine grain Cross-VM Attacks on Xen and VMware are possible!" https://eprint.iacr.org/2014/248.pdf, Worcester Polytechnic Institute, 2014, 12 pages.

(Continued)

*Primary Examiner* — Bing Zhao
(74) *Attorney, Agent, or Firm* — Haynes and Boone LLP

(57) ABSTRACT

Methods, systems, and computer program products for parsing a binary, the parsing including identifying a section that includes a relocation entry; locating padding in a memory page of the section, the section including one or more memory pages; and inserting entropy into the padding.

18 Claims, 5 Drawing Sheets

(56) References Cited

U.S. PATENT DOCUMENTS

| | | | | |
|---|---|---|---|---|
| 2013/0276056 A1* | 10/2013 | Epstein | G06F 21/604 | 726/1 |
| 2013/0290645 A1* | 10/2013 | Van De Ven | G06F 12/0284 | 711/147 |
| 2014/0281324 A1* | 9/2014 | Duluk, Jr. | G06F 12/08 | 711/165 |
| 2015/0047049 A1* | 2/2015 | Panchenko | G06F 21/14 | 726/26 |
| 2015/0052616 A1 | 2/2015 | Hutchison et al. | | |
| 2015/0106872 A1 | 4/2015 | Hiser et al. | | |
| 2015/0186681 A1* | 7/2015 | Lin | G06F 21/6209 | 713/189 |
| 2015/0195302 A1 | 7/2015 | Ghosh et al. | | |
| 2015/0242310 A1* | 8/2015 | Guo | G06F 12/0238 | 711/103 |
| 2016/0092674 A1* | 3/2016 | Hughes | G06F 21/52 | 726/22 |
| 2016/0092675 A1* | 3/2016 | Vidrine | G06F 21/52 | 726/22 |
| 2016/0291891 A1* | 10/2016 | Cheriton | G06F 21/6218 | |
| 2016/0299765 A1* | 10/2016 | Wesie | G06F 9/4401 | |
| 2016/0378679 A1* | 12/2016 | Cintra | G06F 12/1009 | 711/206 |
| 2017/0090816 A1* | 3/2017 | Tsirkin | G06F 3/0604 | |
| 2017/0124322 A1* | 5/2017 | Guilley | G06F 21/54 | |
| 2017/0147240 A1* | 5/2017 | Tsirkin | G06F 3/0619 | |

OTHER PUBLICATIONS

H.J. Lu, "Re: [PATCH] Reduce file size for PT_GNU_RELRO segment" https://sourceware.org/ml/binutils/2015-03/msg00430.html Mar. 29, 2015, 5 pages.

Alan Modra, "Re: Rewrite relro adjusting code" http://permalink.gmane.org/gmane.comp.gnu.binutils/69473, Apr. 22, 2015, 2 pages.

\* cited by examiner

U.S. 10,365,937 B2

ENTROPY INCREASE BY EXECUTABLE LOADER

BACKGROUND

The present disclosure relates generally to virtual computing systems, and more particularly to security in a virtual computing system.

Memory of a virtual computing system is typically divided into units referred to as "pages." Files, for example, are composed in memory of a plurality of memory pages. In some virtual computing systems, a hypervisor reduces physical memory consumption by sharing same-content memory pages between virtual machines. For example, if two virtual machines have a same file, the hypervisor may store a single copy of the file, which is accessed by both virtual machines. This technique is also known as "memory deduplication."

A deduplicated memory page may be written to (e.g., by a guest or guest application) in order to modify the content of the deduplicated memory page. When this happens, the deduplicated memory page may no longer have identical content that is shared between the two virtual machines. Thus, a copy-on-write technique may be utilized to create a separate copy of the memory page that is modified from the deduplicated memory page.

The creation of a separate copy of the memory page using a copy-on-write may result in a write access time that is different than the write access time of a memory page that is not deduplicated. For example, the page access time of the copy-on-write may take measurably longer than a write that is not a copy-on-write. Thus, memory deduplication is vulnerable to an attacker monitoring access times of page writes, in order to determine whether a memory page is deduplicated. A determination that a memory page is deduplicated provides the attacker with information regarding which content (e.g., files and applications) is being used on the virtual machine(s).

BRIEF SUMMARY

According to an example, a method for loading one or more binaries by an operating system loader includes parsing a binary, the parsing including identifying a section that includes a relocation entry. The method further includes locating padding in a memory page of the section, the section including one or more memory pages. The method further includes inserting entropy into the padding.

According to an example, a computer program product stored on a non-transitory computer-readable medium includes machine readable instructions that when executed by a processor cause the processor to locate, in a binary, a section that includes a relocation entry. The instructions further cause the processor to locate padding corresponding to the section. The instructions further cause the processor to generate a random value. The instructions further cause the processor to insert the random value into the padding. The instructions further cause the processor to, after inserting the random value, perform address space layout randomization on a memory offset corresponding to the relocation entry.

According to an example, a system includes a processor and a memory that includes a binary, the binary having a relocation section that includes one or more relocation entries. The system further includes an operating system loader executed by the processor to load the binary, the load of the binary including parsing the binary to identify at least one of: (1) the relocation section and (2) the one or more relocation entries; locating padding in a memory page of the relocation section; generating one or more random values; and inserting the one or more random values into the padding.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
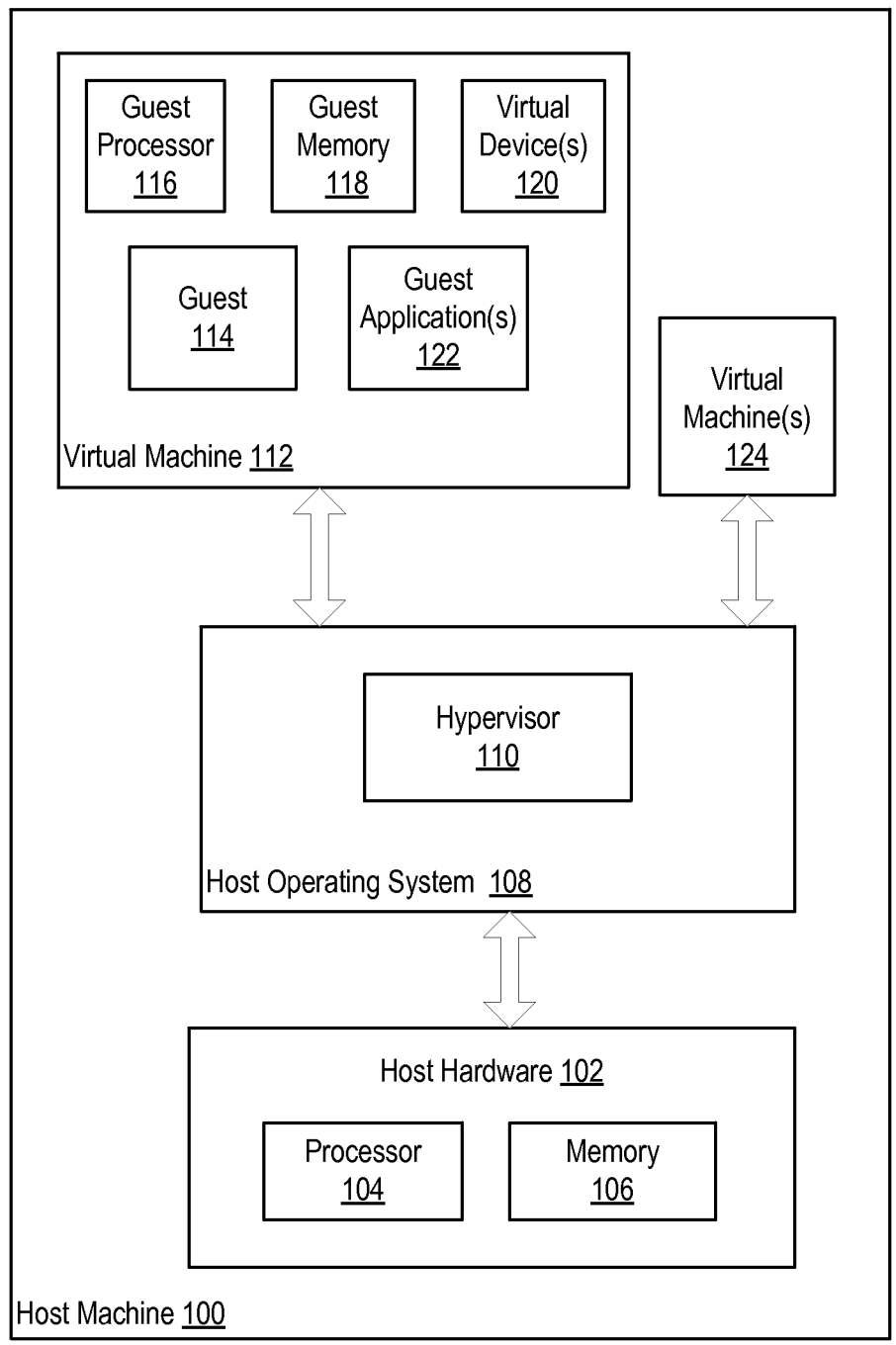
FIG. 1 is an organizational diagram illustrating an example of a computer system hosting a virtual machine, in accordance with various examples of the present disclosure.

A physical computer system that hosts one or more virtual machines, in which various aspects of the present disclosure may be implemented, is described with reference to FIG. 1. The physical computer system is referred to herein as a host machine 100.

Host machine 100 includes host hardware 102. Host hardware includes physical elements such as processor 104, memory 106, and other hardware components (e.g., a network interface device, keyboard, display, and so forth). Host machine 100 may include a single machine or multiple host machines arranged in a cluster.

Host machine 100 includes host operating system 108 that installs and executes software programs. Some examples of types of operating systems that may be run include LINUX, UNIX, OS X, WINDOWS, and so forth. The operating system includes an operating system loader, to load binaries into memory for execution. Host machine 100 includes hypervisor 110 (e.g., QEMU), which also may be referred to as a virtual machine monitor (VMM). In the present example, hypervisor 110 is a component of host operating system 108. In other examples, hypervisor 110 may run on top of host operating system 108, or may run directly on host hardware 102 without the use of a host operating system. The host operating system 108 may include one or more applications, such as a compiler and a linker, to create object files and generate binaries from the object files.

Hypervisor 110 manages system resources, including access of virtual machines to processor 104, memory 106, and other host hardware devices. In the present example, hypervisor 110 is implemented in software and provides one or more virtual machines, such as virtual machine 112. Virtual machine 112 is an underlying emulation of host machine 100. Virtual machine 112 may be, for example, a hardware emulation, full virtualization, para-virtualization, and operating system-level virtualization virtual machine.

The term virtual machine generally refers to part of a host system that is allocated to and available for use by a guest (e.g., guest 114). Virtual machine 112 includes, for example, virtual CPUs (e.g., guest processor 116), virtual memory (e.g., guest memory 118), one or more virtual devices (e.g., virtual device(s) 120) such as a network device, an emulated NIC or disk, physical devices over which a guest is given partial or full control, virtual firmware such as a Basic Input/Output System (BIOS) and/or an Extensible Firmware Interface (EFI), an Advanced Configuration and Power Interface (ACPI), and so forth.

The term "guest" refers to computer readable instructions run on hypervisor 110. Guest 114 may include, for example, a copy of firmware in memory, an operating system, and additional installed software (e.g., guest application(s) 122). In one example, guest 114 may run the same or a different operating system as the host operating system 108. Guest 114 includes an operating system loader, to load binaries into guest memory 118 for execution. One or more guest application(s) 122 run on guest 114. In an example, a guest application may be a process or other type of software application that is executed. A guest application also may refer to a process or application that runs on the guest operating system. Guest application(s) 122 may include applications such as a compiler and a linker, to create object files and generate binaries from the object files.

In the present example, virtual machine(s) 124 are one or more additional virtual machines run by the hypervisor 110.

In the present example, the guest memory 118 stores a plurality of memory pages.

The memory pages may be assigned to sections, including a relocation section. In the present example, the relocation section is a section of a binary or object file that is configured to store relocation entries. A binary may also be referred to as an executable or an application, and may be in the Executable and Linkable Format (ELF) (formerly called the Extensible Linking Format). Relocation entries include memory offsets that identify the memory addresses in memory to load the stack, heap, and/or shared libraries. For example, the memory offsets corresponding to the shared libraries are configured to identify the memory addresses in the memory where the shared libraries are to be loaded, such that the shared libraries may be executed during runtime of the binary.

The guest 114 is configured to protect the relocation entries of the binary by using address space layout randomization (ASLR) to randomize the memory offsets of the relocation entries. ASLR is a security measure to mitigate the chances of an attacker guessing the memory offsets. An attacker may attempt to guess the memory offsets of the relocation entries for various reasons. For example, an attacker who knows the memory offsets of a relocation entry for a shared library may be able to insert malicious code into memory addresses corresponding to the offsets. Thus, when the binary executes the code at the memory addresses, the malicious code is executed rather than the shared library.

In the present example, the hypervisor 110 is configured to use memory deduplication to share memory pages between guests and thus provide the advantage of reducing memory consumption. In the present example, an attacker may attempt to guess memory offsets of the relocation entries of the binary by using a copy-on-write technique. For example, if an attacker is attempting to guess the memory offsets corresponding to relocation entries of the binary, the attacker may create memory pages that include guessed offsets corresponding to the relocation entries. The attacker may then modify the created memory pages while monitoring the access time of the write. The attacker may determine from monitoring the access time whether the write is a regular write or a copy-on-write. If the write is a copy-on-write, the attacker may determine that the created memory page is a duplicate copy of the page that includes the relocation entries. Accordingly, the created page identifies the memory offsets of the relocation entries, which provides the attacker with knowledge of memory addresses that may be used for inserting malicious code.

As a preventive measure to mitigate the security risk of the above described attack, at least one binary (e.g., guest application 122, hypervisor 110, applications corresponding to guest 114, and so forth) is configured with entropy that is inserted at runtime. The entropy includes, for example, one or more randomized values inserted into one or more memory pages, such that the difficulty of guessing the contents of the one or more memory pages is increased.

Figure 2:
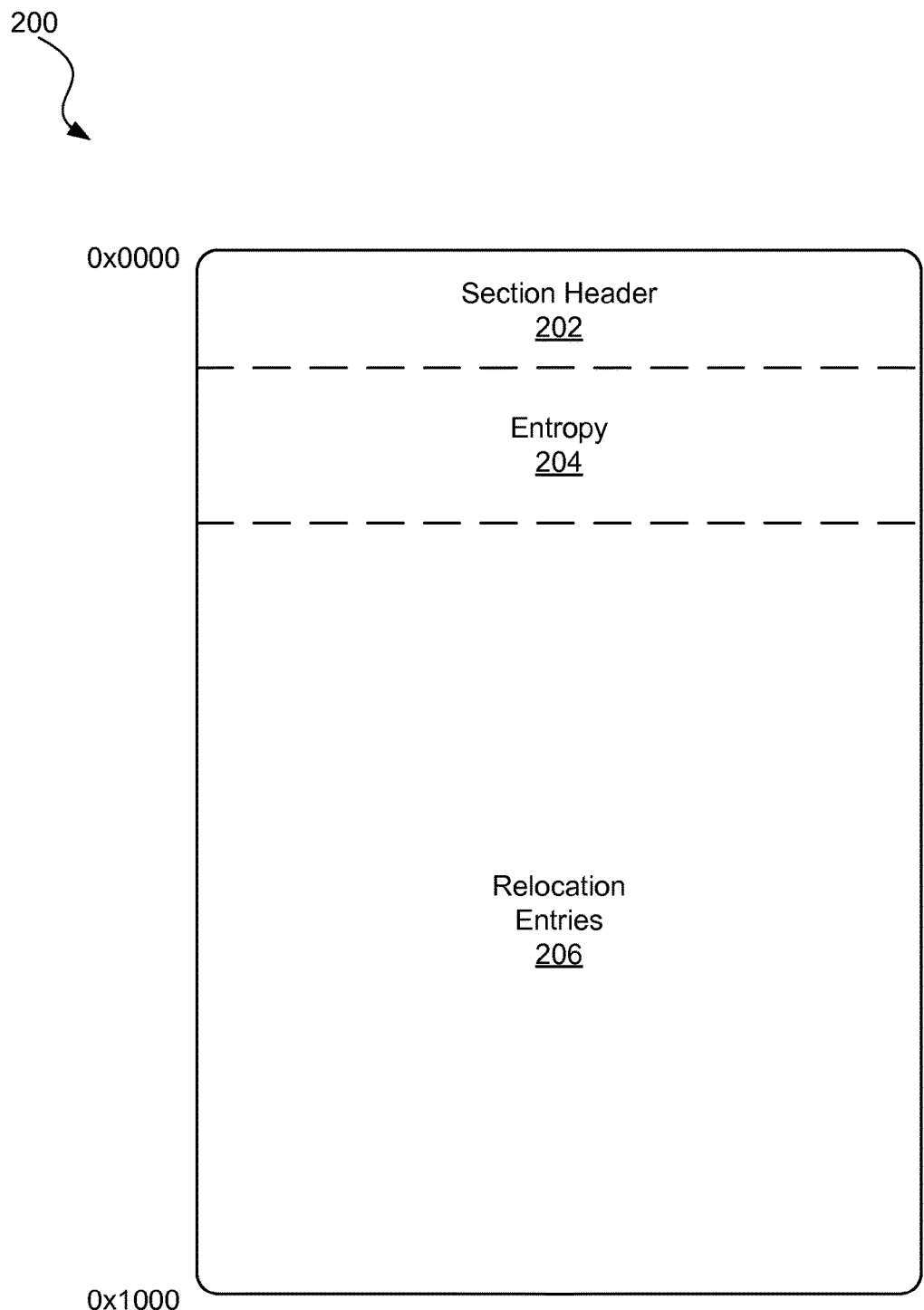
FIG. 2 is an organizational diagram illustrating a memory page including entropy, in accordance with various examples of the present disclosure.

A memory page 200 including entropy, in which various aspects of the present disclosure may be implemented, is described with reference to FIG. 2.

In the present example, the memory page 202 has a length of 0x1000 (4096 bytes). However, in other examples, memory pages may be of other lengths. Offset 0x0000 identifies the beginning of the memory page 200, and offset 0x1000 identifies the end of the memory page 200. In the present example, the memory page 200 is created in a main memory and is filled with code and data corresponding to a binary.

In the present example, the memory page 200 includes a section header 202. The section header 202 identifies the section that corresponds to the memory page 200. Sections may include one or more memory pages. For example, the section that includes memory page 200 may include additional memory pages after memory page 200.

In some examples, the section header 202 is parsed by an operating system loader to identify that the memory page is included within a relocation section. Memory pages in a relocation section include, for example, memory pages that identify entries, such as relocation entries, that are to be filled in at link time or at runtime. Examples of relocation sections are sections that include relocation entries, such as the section including the procedure linkage table (PLT), the section including the global offset table (GOT), and so forth.

Memory page 200 includes entropy 204. In the present example, entropy 204 is one or more random values (random values including pseudorandom values). A random value may be, for example, a random number or pseudorandom number. The random value may be a pre-configured or user-defined number of bytes in length. In the present example, the entropy 204 is positioned following the section header 202. In some examples, the entropy 204 is positioned at or nearby offset 0x0000. Positioning the entropy 204 following the section header 204 or at offset 0x0000 is referred to as positioning the entropy 204 at the "beginning of the page." For example, the entropy 204 may be positioned immediately following the section header 202 in a first page of the section and at the first offset of the page in the other pages of the section. In other examples, entropy 204 is inserted at the end of the page or at any position between the beginning and the end of the page. Entropy 204 may be inserted at one or more contiguous or non-contiguous positions in the memory page.

In the present example, the memory page 200 includes relocation entries 206. Relocation entries 206 include memory offsets that identify memory addresses for loading code and/or data (e.g., shared libraries, stack, heap, and so forth) at runtime. In the present example, the memory offsets are randomized (e.g., using ASLR) by the linker and/or operating system loader, such that each time the binary is loaded the memory offsets identify different memory addresses for loading the code and/or data.

Figure 3:
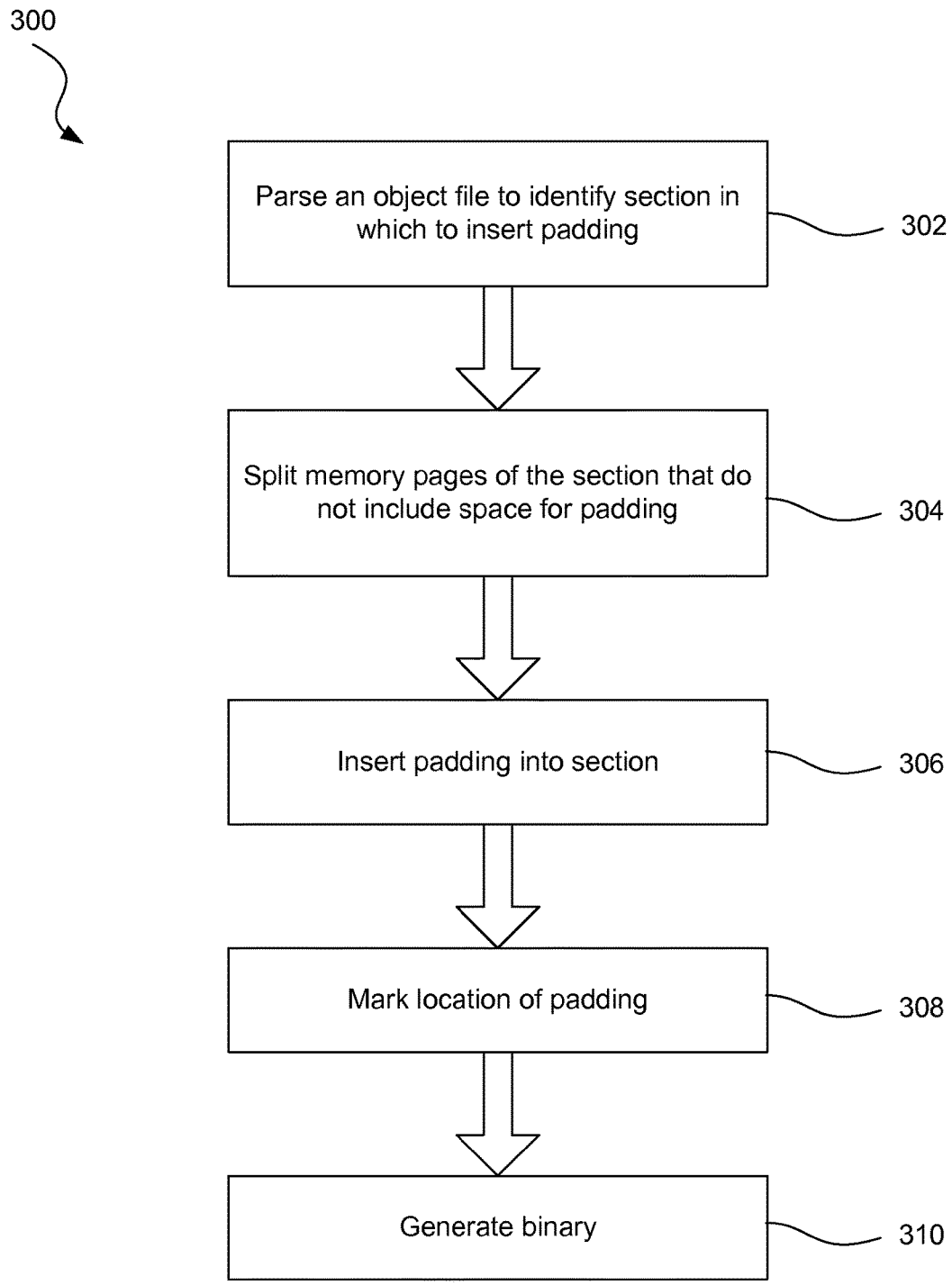
FIG. 3 is a flow diagram showing an illustrative inserting of padding into a binary, in accordance with various examples of the present disclosure.

Turning now to FIG. 3, a flow diagram of a method 300 of inserting padding into a binary is illustrated according to aspects of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In the present example, this method is performed by a linker.

At action 302, an object file is parsed by a linker to identify a section in which to insert padding. In the present example, padding refers to reserved or free space. An object file includes, for example, a file containing object code. In some examples, object code is code output from a compiler. In some examples, object code is not directly executable. Parsing the object file includes, for example, line-by-line input of lines from the object file into functions of the linker, as well as other methods of parsing. In the present example, the object file includes a section header table that identifies locations of sections of the object file. The linker parses the section names from the section header table to identify sections that include relocation entries. These sections may be referred to as relocation sections. Examples of sections that include relocation entries include the procedure linkage table (PLT) section and the global offset table (GOT) section. In some examples, these relocation sections are identified by the linker matching the section names with a pre-configured listing of relocation section names. In other examples, relocation sections may be determined by parsing the object file to identify sections that include relocation entries. The linker may identify one or more sections (e.g., relocation sections) in which to insert padding.

At action 304, having identified one or more sections in which to insert the padding, the linker identifies whether the memory pages of the one or more sections include space for the padding. The linker may compare a size of the free space on each memory page of the section with a pre-configured or user-specified size of padding. If the linker calculates that the padding is smaller than or equal to the size of the free space, then the linker determines that there is space for the padding. If the linker calculates that the padding is larger in size than the free space on the memory page, then the page is split into multiple pages. For example, the memory page may be split into a plurality of pages by creating one or more additional memory pages and dividing the content of the memory page between the original memory page and the additional created memory page(s). Each memory page of the section that does not have enough free space for the padding may similarly be split in order to create free space on each of the memory pages for the padding. The linker may also calculate whether the section boundaries provide sufficient free space to insert the padding. The linker may increase the boundary size to provide additional space for the padding.

At action 306, the padding is inserted into each of the identified sections. In the present example, the padding is inserted into each page of an identified section. In the present example, the padding is inserted into a memory page by reserving a pre-determined or user-configured amount of space in the memory page. The amount of space may be pre-determined, for example, by having the amount of space built into the linker. The amount of space may be user-configured, for example, by having a user specify the amount of space as an argument that is provided to the linker. Space may be reserved by inserting a placeholder relocation entry (also referred to as a fake or dummy relocation entry) that identifies offsets corresponding to the space reserved. The reserved space is referred to as the padding. The placeholder relocation entry may also include a length of the reserved space. In some examples, in addition to reserving space in the memory page, data may also be written into the reserved space that identifies the space as padding. For example, a pre-determined or user-configured identifier may be written into the reserved space.

In the present example, padding is inserted into each memory page of each of the identified one or more sections. The position in each memory page to insert the padding may be at the beginning of the memory page (e.g., at the first memory offset of the memory page or immediately following the section header), the end of the memory page, or anywhere in the memory page. The padding may be inserted in some memory pages in different locations than in other memory pages. Additionally, the reserved space for the padding in each of the memory pages may be of the same size or different sizes, based on pre-determined or user-configured preferences.

At action 308, the location of the padding in each page of each of the identified one or more sections is marked by one or more flags that identify the location(s) of the padding. A flag may include one or more lines that are inserted into the object file that identify one or more locations of the padding. For example, the flag may identify start and end positions of the padding in each memory page, as well as a length of the padding. In some examples, the flag is the placeholder relocation entry itself, or is included in the placeholder relocation entry. For example, the flag may be an identifier or parameter of the placeholder relocation entry. In other examples, the flag is included in a section header table, to identify each section that includes the padding. In yet other examples, the flag is included in each section and/or memory page of the section that includes the padding.

At action 310, based on the object file, the linker generates a binary that includes the inserted padding. In some examples, one or more intermediary programs may be executed in combination with the linker to generate the binary.

Figure 4:
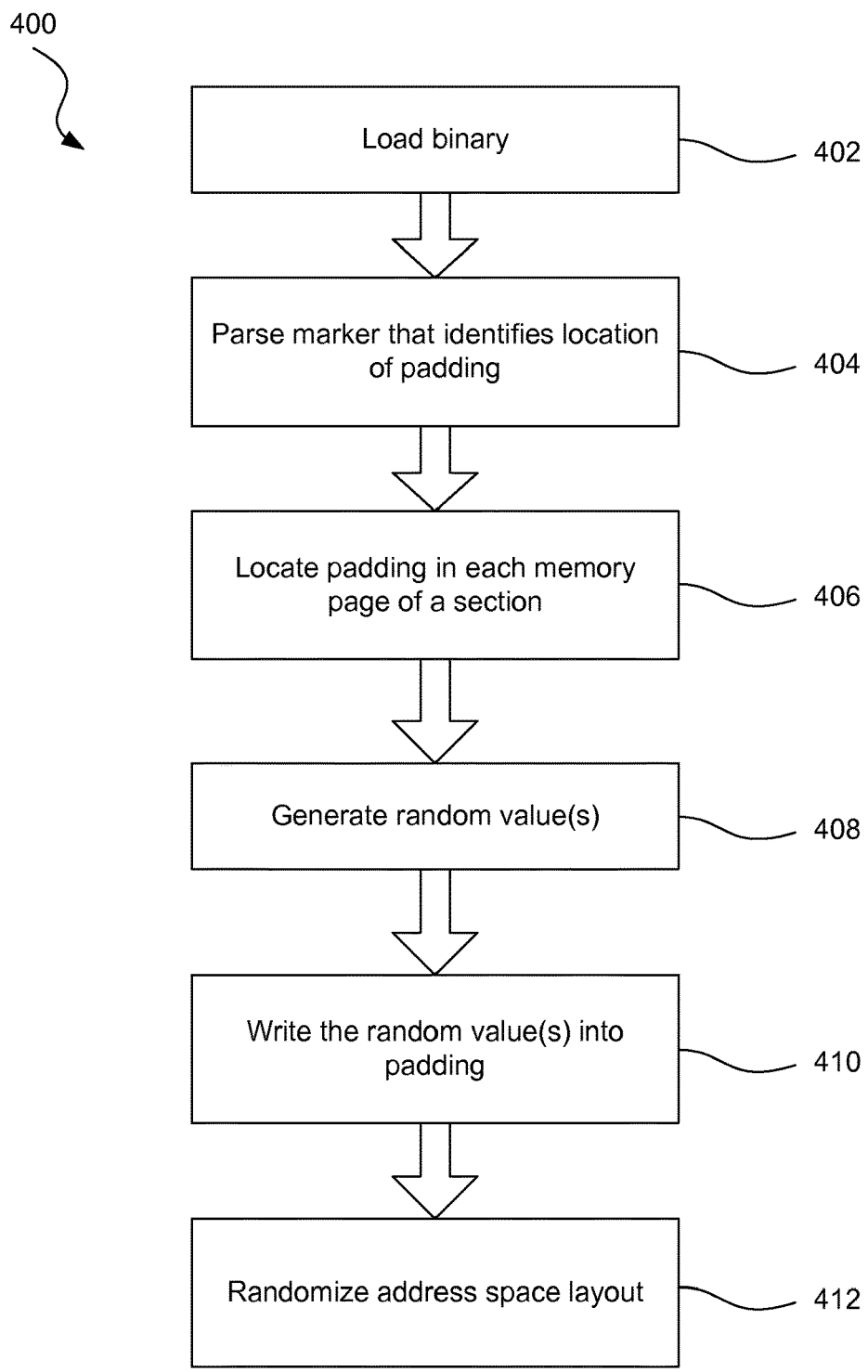
FIG. 4 is a flow diagram showing an illustrative inserting of entropy into padding of a binary, in accordance with various examples of the present disclosure.

Turning now to FIG. 4, a flow diagram of a method 400 of inserting entropy into a binary is illustrated according to aspects of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In the present example, this method is performed by a loader such as an operating system loader.

At action 402, a binary including padding is loaded into main memory so that it may be executed. For example, a user may trigger loading of the binary using a command line interface or graphical user interface. In other examples, loading of the binary may be triggered by another program.

In the present example, a loader "loads" the binary from storage (e.g., from a computer-readable medium) by copying the program into main memory (e.g., random access memory) so that it may be run. One or more parameters may be provided to the operating system loader. For example, a parameter may specify the amount of entropy to insert into the padding. In some examples, the binary is in the Executable and Linkable Format (ELF).

At action 404, the loader parses the binary for a marker such as a flag that identifies the location of the padding. For example, the loader may parse the flag from a section header table, a section, and/or one or more memory pages of a section. In some examples, the flag identifies each section that includes padding. In other examples, the flag identifies each memory page that includes padding. In yet other examples, the flag identifies the position of the padding in each memory page (e.g., by specifying a start position, end position, and/or length corresponding to the padding).

At action 406, the padding in each memory page of a section is located. In the present example, the loader parses any flags, the section header table, and/or the sections of the binary to identify the reserved space corresponding to the padding. In some examples, the padding is identified by one or more flags that specify relocation sections. In other examples, the padding is identified by placeholder relocation entries that identify reserved space corresponding to the padding. The identified reserved space, in this example, is referred to as the padding. In yet other examples, the loader identifies free space in the memory pages of the section that meets a pre-configured or user-defined size threshold. The identified free space, in this example, is referred to as the padding. Free space in a section may be identified by comparing the length of the section to a page length to determine whether the section length is less than the page length. Accordingly, if the section length is less than the page length, the loader identifies that the section includes free space in which to insert entropy. Free space in the memory pages may also be identified, for example, by parsing the contents of the memory pages to locate memory addresses that are unassigned and/or unused.

At action 408, the loader generates one or more random values, such as random numbers. The generating of the random values may occur at any time. For example, the generating of random values may occur at an earlier time, and the random values may be stored until they are ready for use. In other examples, the random values are generated on as as-requested basis. In the present example, the loader generates each random value using a function call. The function may be a function provided by the operating system that returns a random number. In other examples, the loader is configured with a proprietary random number generation algorithm. In the present example, the loader is pre-configured with a length of the random value to generate. In other examples, the length of the random value is user-configured, such as by a user providing the length as a parameter when triggering loading and execution of the binary. In the present example, the number of random values generated is based upon the number of memory pages that include the padding. For example, the loader may parse the sections of the binary to count a number of memory pages. The loader may then generate one or more random values for each memory page that includes the padding, such that each memory page includes one or more unique random values. The loader may also parse each memory page to identify the number of padding portions in each page, such that a random value is generated for each padding portion.

At action 410, the loader writes the random value(s) into one or more memory addresses corresponding to the padding of each memory page. The random value(s) may occupy all of the memory addresses of the padding or a subset of the memory addresses. The random value(s) may be the same or different for each padding portion of each memory page. The writing of the random value(s) into a page is referred to as inserting "entropy" into the page.

At action 412, the loader randomizes the address space layout (e.g., by performing ASLR). In the present example, the loader arranges the address space layout to randomize the memory offsets corresponding to the relocation entries. After randomizing the address space layout, the operating system loader is configured to load the code and/or data corresponding to the relocation entries into memory. For example, if a relocation entry corresponds to a shared library, the shared library is loaded at memory addresses corresponding to the randomized memory offsets identified by the relocation entry.

Figure 5:
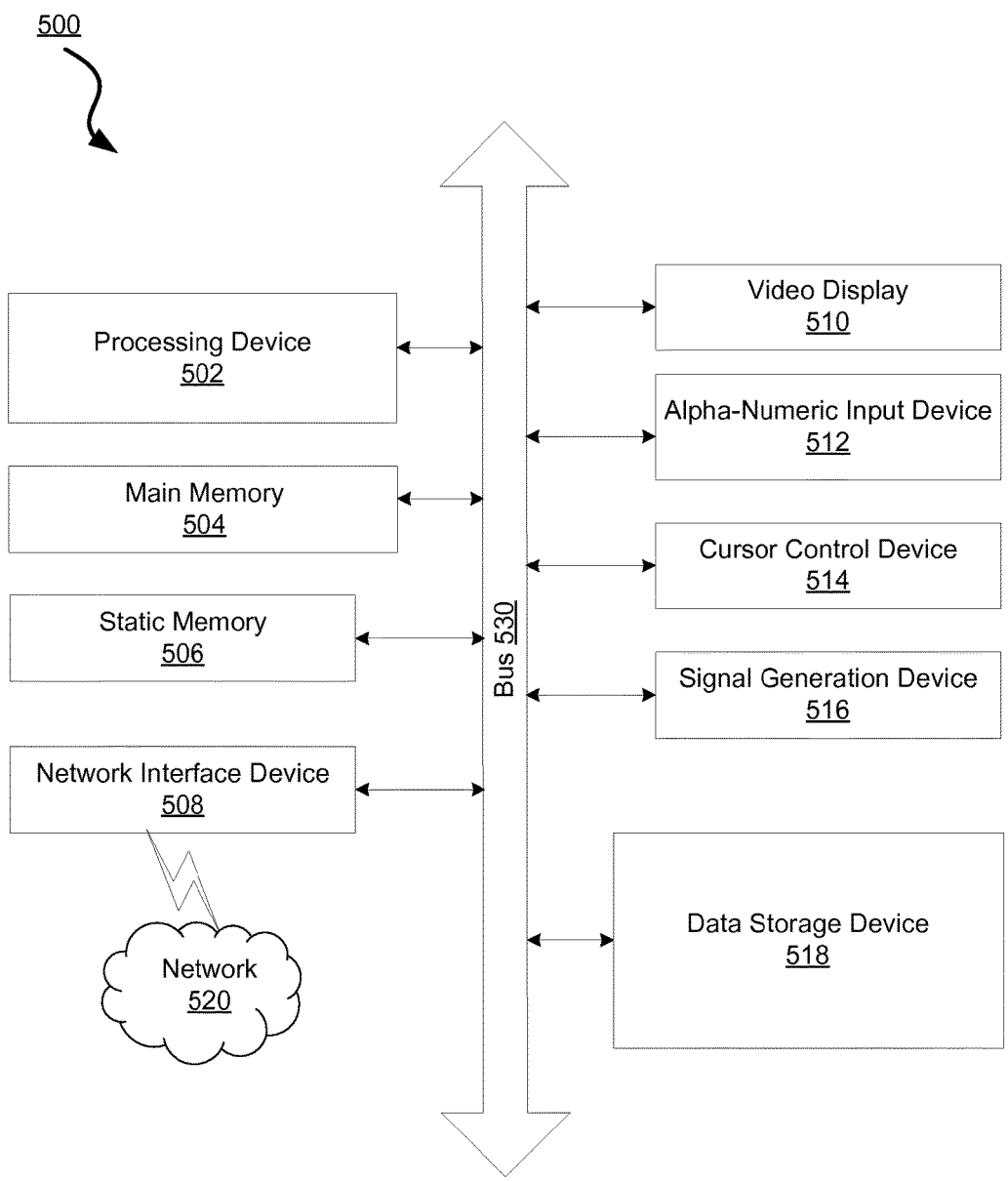
FIG. 5 is an organizational diagram illustrating a computer system that may perform one or more of the operations described herein, in accordance with various examples of the present disclosure.

An organizational diagram of a machine in the form of a computer system 500, within which a set of instructions may be executed to cause the machine to perform any one or more of the methodologies discussed herein, is described with reference to FIG. 5.

In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for loading one or more binaries by an operating system loader, the method comprising:
   parsing a binary, the parsing including identifying a section that includes a relocation entry;
   locating padding in a memory page of the section, the section including one or more memory pages, wherein the padding comprises a free space or a reserved space;
   determining that the memory page does not have a pre-determined or user-configured amount of space;
   in response to the determining, creating an additional memory page in the section and dividing the content of the memory page between the memory page and the additional memory page;
   generating at least one random value;
   after locating the padding, insert the at least one random value into the padding of the memory page; and
   after inserting the at least one random value, perform address space layout randomization on a memory offset corresponding to the relocation entry.

2. The method of claim 1, further comprising:
   parsing, by a linker, an object file to identify the section;
   inserting a placeholder relocation entry into the section, wherein the placeholder relocation entry reserves a pre-determined or user-configured amount of space in the section;
   inserting a flag that identifies a location corresponding to at least one of: (1) the section and (2) the placeholder relocation entry; and
   generating the binary, the binary including the placeholder relocation entry and the flag.

3. The method of claim 1, further comprising:
   parsing a flag in the binary, wherein the flag identifies a location corresponding to at least one of: (1) the section and (2) the padding.

4. The method of claim 1, wherein the relocation entry includes a memory offset corresponding to at least one of: (1) a shared library, (2) a stack, and (3) a heap.

5. The method of claim 1, wherein the binary is in an Executable and Linkable Format (ELF).

6. The method of claim 1, wherein the padding comprises at least one of: (1) free space and (2) space reserved for the inserting of the at least one random value.

7. A computer program product stored on a non-transitory computer-readable medium, the computer program product comprising machine readable instructions that when executed by a processor cause the processor to:
- locate, in a binary, a section that includes a relocation entry;
- locate padding, in each memory page of a plurality of memory pages corresponding to the section, wherein the padding comprises a free space or a reserved space;
- determine that a memory page of the plurality of memory pages does not have a pre-determined or user-configured amount of space;
- in response to the determining, create an additional memory page in the plurality of memory pages corresponding to the section and divide the content of the memory page between the memory page and the additional memory page in the plurality of memory pages corresponding to the section;
- generate at least one random value;
- after locating the padding, insert the at least one random value into the padding of each memory page of the plurality of memory pages; and
- after inserting the at least one random value, perform address space layout randomization on a memory offset corresponding to the relocation entry.

8. The medium of claim 7, the processor further to:
parse a flag in the binary, wherein the flag identifies a location corresponding to at least one of: (1) the section and (2) the padding.

9. The medium of claim 7, wherein the padding comprises:
a placeholder relocation entry that reserves a pre-determined or user-configured amount of space in a memory page of the section.

10. The medium of claim 7, wherein the relocation entry includes a memory offset corresponding to at least one of: (1) a shared library, (2) a stack, and (3) a heap.

11. A system comprising:
a processor;
a memory that includes a binary, the binary having a relocation section that includes one or more relocation entries;
an operating system loader executed by the processor to load the binary, the load of the binary comprising:
- parsing the binary to identify at least one of: (1) the relocation section and (2) the one or more relocation entries;
- locating padding, in at least one memory page of the relocation section, wherein the padding comprises a free space or a reserved space;
- determining that the at least one memory page does not have a pre-determined or user-configured amount of space;
- in response to the determining, creating an additional memory page in the relocation section and dividing the content of the at least one memory page between the at least one memory page and the additional memory page;
- generating one or more random values;
- after locating the padding, inserting the one or more random values into the padding; and
- after inserting the one or more random value, performing address space layout randomization on a memory offset corresponding to the relocation section.

12. The system of claim 11, further comprising a linker, the linker executed by the processor to:
parse a section header table of an object file to identify the relocation section;
insert the padding into each memory page of the relocation section;
set a flag that identifies a location corresponding to the padding; and
generate the binary, the binary including the padding and the flag.

13. The system of claim 12, the linker executed by the processor further to:
determine that a memory page of the relocation section does not have space in which to insert the padding;
based on the determining, split the content of the memory page into a plurality of memory pages; and
insert the padding into each memory page of the plurality of memory pages.

14. The system of claim 11, wherein the padding comprises:
a dummy relocation entry that reserves a pre-determined or user-configured amount of space for the inserting of the one or more random values.

15. The system of claim 11, wherein address space layout randomization is performed on the one or more relocation entries after the inserting of the one or more random values.

16. The system of claim 12, further comprising:
parsing a flag in the binary, wherein the flag identifies a location corresponding to at least one of: (1) the section and (2) the padding.

17. The system of claim 11, wherein the relocation entry includes a memory offset corresponding to at least one of: (1) a shared library, (2) a stack, or (3) a heap.

18. The system of claim 11, wherein the binary is in an Executable and Linkable Format (ELF).

* * * * *